(12) United States Patent
Chae

(10) Patent No.: US 11,375,569 B2
(45) Date of Patent: Jun. 28, 2022

(54) METHOD AND DEVICE FOR RECONNECTING BLUETOOTH COMMUNICATION

(71) Applicant: Samsung Electronics Co., Ltd., Gyeonggi-do (KR)

(72) Inventor: Hochang Chae, Gyeonggi-do (KR)

(73) Assignee: Samsung Electronics Co., Ltd

( * ) Notice: Subject to any disclaimer, the term of this patent is extended or adjusted under 35 U.S.C. 154(b) by 128 days.

(21) Appl. No.: 16/762,408

(22) PCT Filed: Dec. 3, 2018

(86) PCT No.: PCT/KR2018/015182
§ 371 (c)(1),
(2) Date: May 7, 2020

(87) PCT Pub. No.: WO2019/112268
PCT Pub. Date: Jun. 13, 2019

(65) Prior Publication Data
US 2021/0176810 A1    Jun. 10, 2021

(30) Foreign Application Priority Data

Dec. 4, 2017 (KR) .......................... 10-2017-0165302

(51) Int. Cl.
*H04W 4/00*        (2018.01)
*H04W 76/19*       (2018.01)
(Continued)

(52) U.S. Cl.
CPC ............. *H04W 76/19* (2018.02); *H04W 4/80* (2018.02); *H04W 76/14* (2018.02); *H04W 76/18* (2018.02)

(58) Field of Classification Search
CPC ..... H04W 76/18; H04W 76/14; H04W 76/19; H04W 76/10; H04W 4/80; H04W 4/00
(Continued)

(56) References Cited

U.S. PATENT DOCUMENTS 8,750,798 B2 *   6/2014   Rao ........................ H01Q 1/243
                                                          455/41.2
9,509,402 B2 *  11/2016   Ryan .................... H04B 10/116
(Continued)

FOREIGN PATENT DOCUMENTS

KR    1020070098127    10/2007
KR    1020090058618     6/2009
(Continued)

OTHER PUBLICATIONS

PCT/ISA/210 Search Report issued on PCT/KR2018/015182, pp. 5.
(Continued)

*Primary Examiner* — Marceau Milord
(74) *Attorney, Agent, or Firm* — The Farrell Law Firm, P.C.

(57) ABSTRACT

The embodiments disclosed in the present disclosure relate to a method for reconnecting Bluetooth communication and a device supporting the same. An electronic device according to various embodiments of the present invention comprises: a Bluetooth communication circuit including a control circuit; a processor electrically connected to the Bluetooth communication circuit; and a memory electrically connected to the processor, wherein the memory stores an instruction that causes the processor to provide a reconnection request to the control circuit when Bluetooth communication with an external device is disconnected, and the control circuit can attempt to reconnect the Bluetooth communication with the external device by periodically transmitting a connection request for the Bluetooth communica-
(Continued)

tion to the external device for a predetermined time period without repeatedly calling application programming interfaces (API's) received from the processor, in response to the reception of the reconnection request.

13 Claims, 9 Drawing Sheets

(51) Int. Cl.
*H04W 76/18* (2018.01)
*H04W 76/14* (2018.01)
*H04W 4/80* (2018.01)

(58) Field of Classification Search
USPC .............................. 370/329, 386, 338, 401
See application file for complete search history.

(56) References Cited

U.S. PATENT DOCUMENTS

| | | | |
|---|---|---|---|
| 9,853,458 B1* | 12/2017 | Bell | H02J 50/90 |
| 10,097,529 B2* | 10/2018 | Kang | H04W 12/50 |
| 10,306,705 B2* | 5/2019 | Shanmugam | H04W 84/12 |
| 10,521,031 B2* | 12/2019 | Kim | G06F 3/04883 |
| 10,534,900 B2* | 1/2020 | Cheong | H04W 4/00 |
| 2002/0159401 A1 | 10/2002 | Boger | |
| 2014/0079043 A1* | 3/2014 | Montemurro | H04W 36/24 370/338 |
| 2014/0098671 A1* | 4/2014 | Raleigh | G06Q 20/40 370/235 |
| 2014/0171055 A1* | 6/2014 | Oshita | H04W 12/12 455/418 |
| 2015/0289308 A1 | 10/2015 | Kang et al. | |
| 2016/0099602 A1* | 4/2016 | Leabman | H02J 50/80 307/104 |
| 2016/0099613 A1* | 4/2016 | Bell | H02J 7/025 307/104 |
| 2016/0099757 A1* | 4/2016 | Leabman | H02J 7/025 307/104 |
| 2016/0198290 A1 | 7/2016 | Hong et al. | |
| 2017/0064754 A1 | 3/2017 | Choi et al. | |
| 2017/0078922 A1* | 3/2017 | Raleigh | H04W 28/10 |
| 2018/0348893 A1* | 12/2018 | Kim | G06F 3/038 |
| 2019/0361694 A1* | 11/2019 | Gordon | G06F 1/1673 |
| 2019/0364492 A1* | 11/2019 | Azizi | H04W 48/16 |
| 2020/0220746 A1* | 7/2020 | Shribman | G06F 9/45545 |
| 2020/0344084 A1* | 10/2020 | Shribman | H04L 69/16 |

FOREIGN PATENT DOCUMENTS

| | | |
|---|---|---|
| KR | 1020100070875 | 6/2010 |
| KR | 1020150026263 | 3/2015 |
| KR | 1020150114845 | 10/2015 |
| KR | 1020170027118 | 3/2017 |

OTHER PUBLICATIONS

PCT/ISA/237 Written Opinion issued on PCT/KR2018/015182, pp. 5.

Korean Office Action dated Oct. 28, 2021 issued in counterpart application No. 10-2017-0165302, 11 pages.

* cited by examiner

METHOD AND DEVICE FOR RECONNECTING BLUETOOTH COMMUNICATION

PRIORITY

This application is a National Phase Entry of International Application No. PCT/KR2018/015182, which was filed on Dec. 3, 2018, and claims priority to Korean Patent Application No. 10-2017-0165302 filed in the Korean Intellectual Property Office on Dec. 4, 2017, the content of each of which is incorporated herein by reference.

BACKGROUND

1. Field

Embodiments of the disclosure relate to a method for reconnecting Bluetooth communication and an apparatus for supporting the same.

2. Description of the Related Art

As smartphones or such portable electronic devices deliver high performance, more and more services and additional functions are offered via electronic devices. Communication carriers or electronic device manufacturers make an effort to pack electronic devices with various components to meet users' needs and make electronic devices more useful and develop relevant techniques.

Such electronic devices may communicate data using a diversity of wireless communication methods. For example, an electronic device may exchange data with other electronic devices via short-range wireless communication schemes, such as wireless LAN (WLAN), Zigbee, Z-Wave, ultra-wide band (UWB), ultra-narrow band (UNB), wireless USB, wireless gigabit (WiGig), Bluetooth, Bluetooth low energy (BLE), wireless HD, transfer jet, wireless firewire, etc. Such a variety of short-range wireless communication techniques may be properly applied and used on electronic devices depending on standards defined therefor or their usage.

For example, electronic devices located near each other may be linked together and communicate various pieces of data via Bluetooth communication.

SUMMARY

If Bluetooth communication is disconnected, e.g., because they part away from each other, at least one electronic device may perform an operation for reconnecting the Bluetooth communication. Meanwhile, since the Bluetooth communication standards specify nothing related to methods for reconnecting Bluetooth communication, each electronic device manufacturer may take a different approach for Bluetooth reconnection.

For example, if Bluetooth communication is disconnected between an electronic device (e.g., a smartphone) and an external accessory device (e.g., a smart watch), at least one of the electronic device or the external device may carry out an operation for reconnecting Bluetooth communication. For example, the external accessory device may periodically and repeatedly send out a connection request to the electronic device to reconnect Bluetooth communication, and the electronic device may reconnect Bluetooth communication with the external device based on the connection request received from the external device. Such an operation may be performed in the opposite way. For example, the electronic device may periodically and repeatedly transmit a connection request to the external device to reconnect Bluetooth communication, and the external device may reconnect Bluetooth communication with the electronic device based on the connection request received from the electronic device.

Meanwhile, such an attempt to reconnect Bluetooth communication may be performed primarily by the external accessory device which includes fewer components than the electronic device. In relation to the attempt to reconnect Bluetooth communication, the operation of periodically and repeatedly transmitting a connection request requires periodic activation of various components including the application processor. Thus, if such an operation is carried out by the electronic device including more components than the accessory type external device, the electronic device may consume more power. Thus, the accessory type external device configured with relatively fewer components than the electronic device may perform an attempt to reconnect Bluetooth communication.

As such, if the electronic device makes no attempt to restore Bluetooth communication connection for the reason of, e.g., power consumption, the electronic device may be less used or accessed for Bluetooth communication.

Embodiments disclosed herein regard methods for minimizing power consumption that may occur when an electronic device supporting short-range wireless communication, e.g., Bluetooth communication, attempts to reconnect Bluetooth communication with the external device that the electronic device used to have connection before with and, according to various embodiments of the disclosure, the electronic device may be used and accessed more for functions related to Bluetooth communication. To that end, various embodiments disclosed herein include contents related to design of new instructions between a Bluetooth chip and an application processor and content related to implementing a software stack and interface.

According to various embodiments of the present invention, an electronic device comprises a Bluetooth communication circuit including a control circuit, a processor electrically connected with the Bluetooth communication circuit, and a memory electrically connected with the processor, wherein the memory stores an instruction that, when Bluetooth communication with an external device is disconnected, enables the processor to provide a reconnection request to the control circuit, and wherein the control circuit may be configured to, in response to reception of the reconnection request, attempt to reconnect the Bluetooth communication with the external device by transmitting a connection request of the Bluetooth communication to the external device periodically during a preset period, without repeated invocation of application programming interfaces (APIs) received from the processor.

According to various embodiments of the present invention, there is provided a computer readable recording medium storing a program configured to execute a method for reconnecting Bluetooth communication by an electronic device including a Bluetooth communication circuit, the method comprising when Bluetooth communication with an external device is disconnected, providing a reconnection request from a processor of the electronic device to a control circuit included in the Bluetooth communication circuit and in response to reception of the reconnection request, attempting to reconnect Bluetooth communication with the external device by transmitting a connection request of Bluetooth communication from the control circuit to the external device periodically during a preset period, without repeated invocation of application programming interfaces (APIs) received from the processor.

According to various embodiments of the present invention, an electronic device may reduce power consumption that may occur upon attempting to reconnect Bluetooth communication with an external device that it used to be in connection with. For example, according to various embodiments of the present invention, an electronic device may reduce the number of times of operation by an application processor chip by allowing operations periodically repeated to be performed via the Bluetooth chip, thus reducing power consumption that may occur upon attempting to reconnect Bluetooth communication.

According to various embodiments of the present invention, an electronic device may be used and accessed more often for functions related to Bluetooth communication.

DETAILED DESCRIPTION

Hereinafter, embodiments of the disclosure are described with reference to the accompanying drawings.

Figure 1:
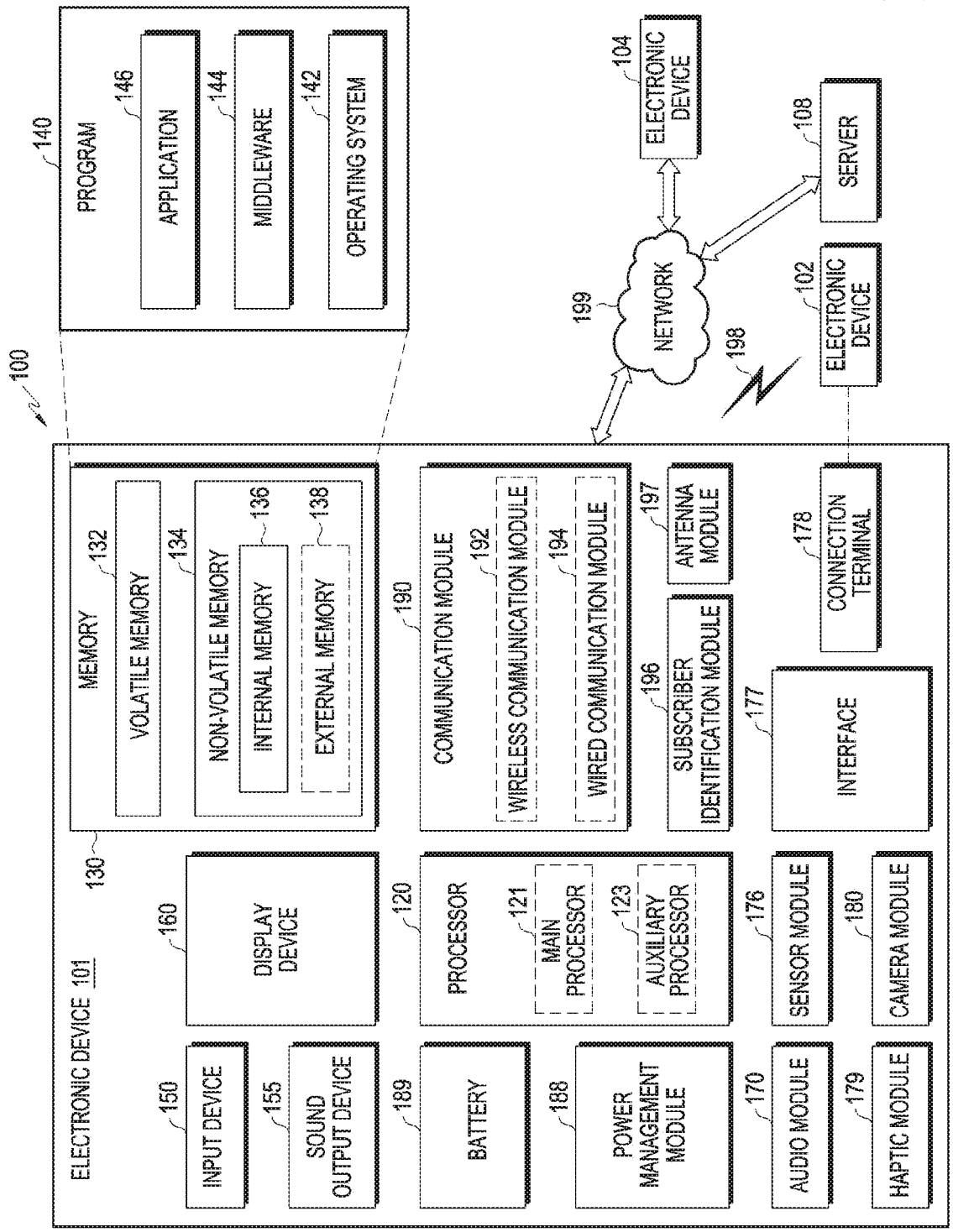
FIG. 1 is a block diagram illustrating an electronic device in a network environment according to various embodiments of the present invention.

FIG. 1 is a block diagram illustrating an electronic device 101 in a network environment 100 according to an embodiment. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, and an antenna module 197. In some embodiments, the electronic device 101 may exclude at least one (e.g., the display device 160 or the camera module 180) of the components or add other components. In some embodiments, some components may be implemented to be integrated together, e.g., as if the sensor module 176 (e.g., a fingerprint sensor, an iris sensor, or an illuminance sensor) is embedded in the display device (160) (e.g., a display).

The processor 120 may be driven by software (e.g., a program 140) to control at least one other component (e.g., a hardware or software component) of the electronic device 101 connected with the processor 120 and may process or compute various data. The processor 120 may load and process command or data received from another component (e.g., the sensor module 176 or the communication module 190) on a volatile memory 132, and the processor 120 may store resultant data in a non-volatile memory 134. According to an embodiment, the processor 120 may include a main processor 121 (e.g., a central processing unit (CPU) or an application processor), and additionally or alternatively, an auxiliary processor 123 (e.g., a graphics processing unit (GPU), an image signal processor, a sensor hub processor, or a communication processor) that is operated independently from the main processor 121 and that consumes less power than the main processor 121 or is specified for a designated function. Here, the auxiliary processor 123 may be operated separately from or embedded in the main processor 121.

In such case, the auxiliary processor 123 may control at least some of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., performing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120) of the electronic device 101, e.g., software (e.g., the program 140) and input data or output data for a command related to the software. The memory 130 may include the volatile memory 132 or the non-volatile memory 134.

The program 140, as software stored in the memory 130, may include, e.g., an operating system (OS) 142, middleware 144, or an application 146.

The input device 150 may be a device for receiving a command or data, which is to be used for a component (e.g., the processor 120) of the electronic device 101, from an outside (e.g., a user) of the electronic device 101. The input device 150 may include, e.g., a microphone, a mouse, or a keyboard.

The sound output device 155 may be a device for outputting sound signals to the outside of the electronic device 101. The sound output device 155 may include, e.g., a speaker which is used for general purposes, such as playing multimedia or recording and playing, and a receiver used for call receiving purposes only. According to an embodiment, the receiver may be formed integrally or separately from the speaker.

The display 160 may be a device for visually providing information to a user of the electronic device 101. The display device 160 may include, e.g., a display, a hologram device, or a projector and a control circuit for controlling the display, hologram device, or projector. According to an embodiment, the display device 160 may include touch circuitry or a pressure sensor capable of measuring the strength of a pressure for a touch.

The audio module 170 may convert a sound into an electrical signal and vice versa. According to an embodiment, the audio module 170 may obtain a sound through the input device 150 or output a sound through the sound output device 155 or an external electronic device (e.g., an electronic device 102 (e.g., a speaker or a headphone) via a wire or wirelessly connected with the electronic device 101.

The sensor module 176 may generate an electrical signal or data value corresponding to an internal operating state (e.g., power or temperature) or external environmental state of the electronic device 101. The sensor module 176 may include, e.g., a gesture sensor, a gyro sensor, an atmospheric pressure sensor, a magnetic sensor, an acceleration sensor, a grip sensor, a proximity sensor, a color sensor, an infrared (IR) sensor, a bio sensor, a temperature sensor, a humidity sensor, or an illuminance sensor.

The interface 177 may support a designated protocol enabling a wired or wireless connection with an external electronic device (e.g., the electronic device 102). According to an embodiment, the interface 177 may include a high definition multimedia 30 interface (HDMI), a universal serial bus (USB) interface, a secure digital (SD) card interface, or an audio interface.

A connecting terminal 178 may include a connector, e.g., an HDMI connector, a USB connector, an SD card connector, or an audio connector (e.g., a headphone connector), which is able to physically connect the electronic device 101 with an external electronic device (e.g., the electronic device 102).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, e.g., a motor, a piezoelectric element, or an electric stimulator.

The camera module 180 may capture a still image or moving images. According to an embodiment, the camera module 180 may include one or more lenses, an image sensor, an image signal processor, or a flash.

The power management module 188 may be a module for managing power supplied to the electronic device 101. The power management module 188 may be configured as at least part of, e.g., a power management integrated circuit (PMIC).

The battery 189 may be a device for supplying power to at least one component of the electronic device 101. The battery 189 may include, e.g., a primary cell which is not rechargeable, a secondary cell which is rechargeable, or a fuel cell.

The communication module 190 may support establishing a wired or wireless communication channel between the electronic device 101 and an external electronic device (e.g., the electronic device 102, the electronic device 104, or the server 108) and performing communication through the established communication channel. The communication module 190 may include one or more communication processors that are operated independently from the processor 120 (e.g., an application processor) and supports wired or wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of the wireless communication module 192 and the wired communication module 194 may be used to communicate with an external electronic device through a first network 198 (e.g., a short-range communication network, such as Bluetooth, wireless-fidelity (Wi-Fi) direct, or infrared data association (IrDA)) or a second network 199 (e.g., a long-range communication network, such as a cellular network, the Internet, or a communication network (e.g., LAN or wide area network (WAN)). The above-enumerated types of communication modules 190 may be implemented in a single chip or individually in separate chips.

According to an embodiment, the wireless communication module 192 may differentiate and authenticate the electronic device 101 in the communication network using user information stored in the subscriber identification module 196.

The antenna module 197 may include one or more antennas for transmitting or receiving a signal or power to/from an outside. According to an embodiment, the communication module 190 (e.g., the wireless communication module 192) may transmit or receive a signal to/from an external electronic device through an antenna appropriate for a communication scheme.

Some of the above-described components may be connected together through an inter-peripheral communication scheme (e.g., a bus, general purpose input/output (GPIO), serial peripheral interface (SPI), or mobile industry processor interface (MIPI)), communicating signals (e.g., commands or data) therebetween.

According to an embodiment, commands or data may be transmitted or received between the electronic device 101 and the external electronic device 104 via the server 108 coupled with the second network 199. The first and second external electronic devices 102 and 104 each may be a device of the same or a different type from the electronic device 101. According to an embodiment, all or some of operations executed on the electronic device 101 may be run on one or more other external electronic devices. According to an embodiment, when the electronic device 101 should perform a certain function or service automatically or at a request, the electronic device 101, instead of, or in addition to, executing the function or service on its own, may request an external electronic device to perform at least some functions associated therewith. The external electronic device receiving the request may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

The electronic device according to various embodiments may be one of various types of electronic devices. The electronic devices may include at least one of, e.g., a portable communication device (e.g., a smartphone), a computer device, a portable multimedia device, a portable medical device, a camera, a wearable device, or a home appliance. According to an embodiment of the disclosure, the electronic device is not limited to the above-listed embodiments.

It should be appreciated that various embodiments of the disclosure and the terms used therein are not intended to limit the techniques set forth herein to particular embodiments and that various changes, equivalents, and/or replacements therefor also fall within the scope of the disclosure. The same or similar reference denotations may be used to refer to the same or similar elements throughout the specification and the drawings. It is to be understood that singular forms such as "a," "an," and "the" may also refer to the plural unless the context clearly dictates otherwise. As used herein, the term "A or B," "at least one of A and/or B," "A, B, or C," or "at least one of A, B, and/or C" may include all possible combinations of the enumerated items. As used herein, the terms "1st" or "first" and "2nd" or "second" may refer to corresponding components without implying an order of importance, and are used merely to distinguish each component from the others without unduly limiting the components. It will be understood that when an element (e.g., a first element) is referred to as being (operatively or communicatively) "coupled with/to," or "connected with/to" another element (e.g., a second element), it can be coupled or connected with/to the other element directly or via a third element.

As used herein, the term "module" includes a unit configured in hardware, software, or firmware and may interchangeably be used with certain other terms, e.g., "logic," "logic block," "part," or "circuit." A module may be a single integrated component or a portion of a component for performing one or more functions. For example, the module may be configured in an application-specific integrated circuit (ASIC).

Various embodiments as set forth herein may be implemented as software (e.g., the program 140) containing commands that are stored in a machine (e.g., computer)-readable storage medium (e.g., an internal memory 136) or an external memory 138. The machine may be a device that may invoke the commands stored in the storage medium and may be operated as per the invoked command. The machine may include an electronic device (e.g., the electronic device 101) according to embodiments disclosed herein. When the commands are executed by a processor (e.g., the processor 120), the processor may perform a function corresponding to the instruction on its own or using other components under the control of the processor. The commands may contain code that is made by a compiler or code executable by an interpreter. The machine-readable storage medium may be provided in the form of a non-transitory storage medium. Here, the term "non-transitory" simply means that the storage medium does not include transitory signals and is tangible, but this term does not differentiate between where data is permanently or semi-permanently stored in the storage medium and where data is temporarily stored in the storage medium.

According to an embodiment, methods according to various embodiments of the disclosure may be included and provided in a computer program product. The computer program products may be traded as commodities between sellers and buyers. The computer program product may be distributed in the form of a machine-readable storage medium (e.g., a compact disc read only memory (CD-ROM)) or online through an application store (e.g., Play-store™). When distributed online, at least part of the computer program product may be temporarily generated or at least temporarily stored in a storage medium, such as the manufacturer's server, a server of the application store, or a relay server.

According to various embodiments, each component (e.g., module or program) may be implemented as single or multiple components, and the various embodiments disclosed herein may exclude some of the sub components or add other sub components. Alternatively or additionally, some components (e.g., modules or programs) may be integrated into a single entity that may then perform the respective (pre-integration) functions of the components in the same or similar manner. According to various embodiments, operations performed by modules, programs, or other components may be carried out sequentially, in parallel, repeatedly, or heuristically, or at least some operations may be executed in a different order or omitted, or other operations may be added.

According to various embodiments of the present invention, an electronic device (e.g., the electronic device 101 of FIG. 1) comprises a Bluetooth communication circuit (e.g., the wireless communication module 192 of FIG. 1) including a control circuit (e.g., the auxiliary processor 123 of FIG. 1), a processor (e.g., the main processor 121 of FIG. 1) electrically connected with the Bluetooth communication circuit, and a memory (e.g., the memory 130 of FIG. 1) electrically connected with the processor, wherein the memory stores an instruction that, when Bluetooth communication with an external device (e.g., the electronic device 102 or 104 of FIG. 1) is disconnected, enables the processor to provide a reconnection request to the control circuit, and wherein the control circuit may be configured to, in response to reception of the reconnection request, attempt to reconnect the Bluetooth communication with the external device by transmitting a connection request of the Bluetooth communication to the external device periodically during a preset period, without repeated invocation of application programming interfaces (APIs) received from the processor.

According to various embodiments of the present invention, in the electronic device, the control circuit may be configured to, when the Bluetooth communication is reconnected, provide a response corresponding to the reconnection request to the processor.

According to various embodiments of the present invention, in the electronic device, the control circuit may be configured to use universal asynchronous receiver/transmitter (UART) communication to receive the reconnection request and transmit the response.

According to various embodiments of the present invention, in the electronic device, the reconnection request may include an instruction related to at least one of information about the external device to receive the connection request of the Bluetooth communication, a period in which the connection request is transmitted, and a number of times in which the connection request is transmitted.

According to various embodiments of the present invention, in the electronic device, the control circuit may be configured to determine the external device to receive the connection request of the Bluetooth communication based on the instruction and, after the connection request is transmitted, determine whether to receive a response corresponding to the connection request from the external device.

According to various embodiments of the present invention, in the electronic device, the control circuit may be configured to, if the response corresponding to the connection request is not received before a new connection request is transmitted to the external device according to the period in which the connection request is transmitted, determine that the connection request fails and transmit the new connection request to the external device.

According to various embodiments of the present invention, in the electronic device, the control circuit may be configured to repeat the determination of whether the connection request fails and the transmission of the new connection request to the external device based on the number of times in which the connection request is transmitted.

According to various embodiments of the present invention, in the electronic device, the control circuit may be configured to, if the response corresponding to the connection request is not received within the number of times in which the connection request is transmitted, generate a response indicating that the attempt to reconnect the Bluetooth communication fails and transmit the generated response to the processor.

According to various embodiments of the present invention, in the electronic device, the memory may store instructions to enable the processor to, when the Bluetooth communication with the external device is disconnected, detect a cause of disconnection of the Bluetooth communication and determine whether the detected cause is due to a preset condition.

According to various embodiments of the present invention, in an electronic device, the memory may store an instruction to enable the processor to, corresponding to determining that the detected cause is not due to the preset condition, generate the reconnection request.

Figure 2:
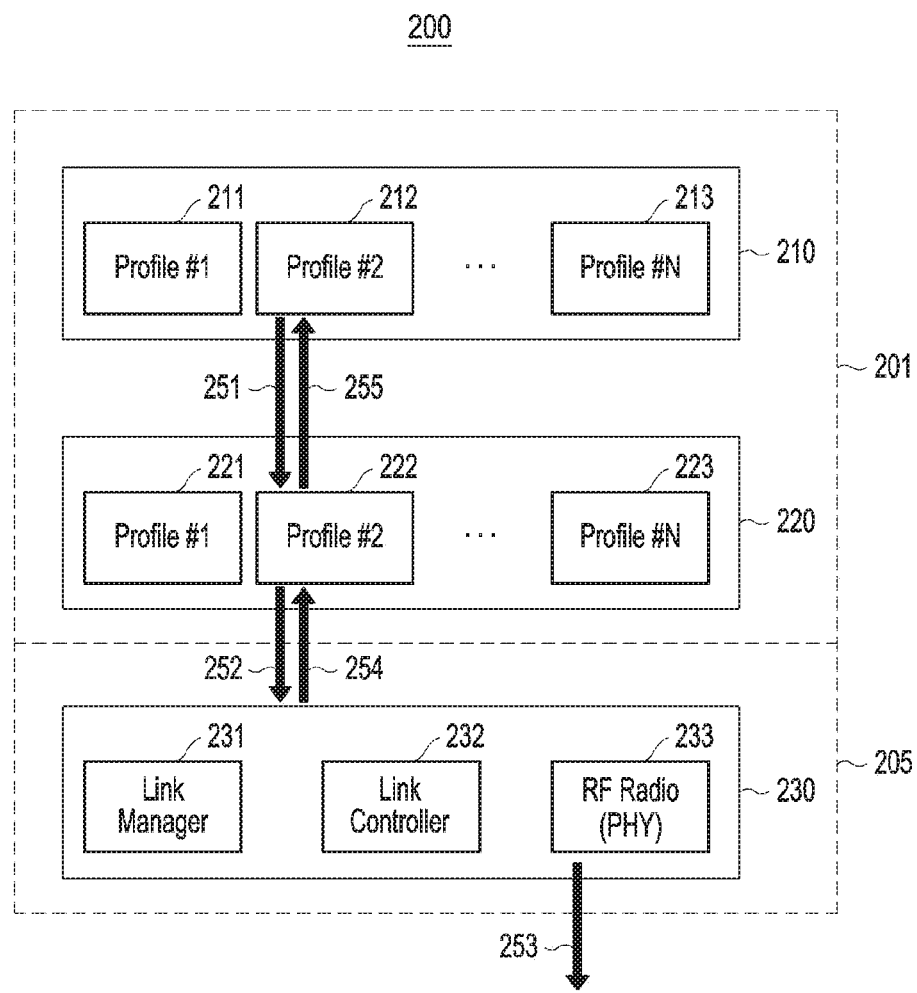
FIG. 2 is a view illustrating a software structure of an electronic device performing Bluetooth communication according to various embodiments of the present invention.

FIG. 2 is a view illustrating a software structure of an electronic device performing Bluetooth communication according to various embodiments of the present invention.

According to an embodiment, an electronic device 200 (e.g., the electronic device 101 of FIG. 1) may communicate with an external electronic device (e.g., the electronic device 102 of FIG. 1) via short-range wireless communication. For example, the electronic device 200 may be connected with the external electronic device via Bluetooth communication.

The electronic device 200 may include at least one processor (e.g., the processor 120 of FIG. 1) and a Bluetooth communication module 205 (e.g., the wireless communication module 192 of FIG. 1) used for Bluetooth communication. In relation thereto, FIG. 2 illustrates a block diagram of a software structure related to operations that may be performed via the processor 201 and the Bluetooth communication module 205. The processor 201 may include a Bluetooth application 210 and a Bluetooth stack 220 and may use data included in the Bluetooth application 210 and the Bluetooth stack 220. Further, the Bluetooth communication module 205 may include Bluetooth firmware 230 and may use data included in the Bluetooth firmware 230.

The Bluetooth application 210 may include one or more profiles 211, 212, and 213 defined in Bluetooth communication standards. Here, the profiles define, e.g., what kinds of data are transmitted when a specific application is used in the Bluetooth application 210 and specifies the kind, structure, and usage of protocols available to electronic devices using Bluetooth communication. For example, the Bluetooth application 210 may include profiles such as Advanced Audio Distribution Profile (A2DP), Generic Access Profile (GAP), Human Interface Device Profile (HID), Headset Profile (HSP), etc. Further, the Bluetooth stack 220 may include one or more profiles 221, 222, and 223 that are one-to-one matched to the profiles included in the Bluetooth application 210 to perform a series of communication operations.

The Bluetooth firmware 230 may include a link manager 231, a link controller 232, and an RF radio 233. The link manager 231 is a protocol that sets up and manages a link using a link manager protocol (LMP) message and, when processing related to link setup and management is performed in a baseband (not shown), the link manager 231 may wirelessly transmit/receive packets to/from an external electronic device, transfer the result of baseband processing to the external electronic device, and receive the result of the transfer, thereby setting up and managing a link. At this time, the LMP message is not transferred to a higher layer of the link manager 231 and may be transmitted/received only between the link managers of electronic devices. The link controller 232 may transmit packets for one radio link, configure packet header, manage hardware data buffer, and perform packet retransmission algorithm. The RF radio 233 may output wireless signals according to the specifications specified in the standards.

According to an embodiment, if Bluetooth communication is disconnected between the electronic device 200 and an external electronic device, the processor 201 may determine whether reconnection of Bluetooth communication is necessary for each of the profiles 211, 212, and 213 included in the Bluetooth application 210. If the profiles 211, 212, and 213 included in the Bluetooth application 210 include a profile requiring reconnection of Bluetooth communication, an instruction for invoking an application programming interface (API) corresponding to the profile may be transferred from the Bluetooth application 210 to the Bluetooth stack 220. For example, upon determining that reconnection of Bluetooth communication for the second profile 212 included in the Bluetooth application 210 is determined to be needed, the processor 201 may invoke the API corresponding to the second profile 212 from the Bluetooth stack 220 as in operation 251 of FIG. 2.

If the instruction to invoke the API corresponding to the second profile 212 is transferred to the Bluetooth stack 220, the processor 201 may identify the second profile 222 in the Bluetooth stack 220 corresponding to the second profile 212. Then, the processor 201 may transfer a reconnection request of Bluetooth communication for the identified second profile 222 in the Bluetooth stack 220 to the Bluetooth communication module 205. For example, the processor 201 may transfer a reconnection request of Bluetooth communication for the identified second profile 222 in the Bluetooth stack 220 to the Bluetooth firmware 230 inside the Bluetooth communication module 205 as in operation 252 of FIG. 2.

If the reconnection request of Bluetooth communication is transferred to the Bluetooth firmware 230, the Bluetooth communication module 205 may generate a radio frequency (RF) signal corresponding to the transferred reconnection request and transfer the generated RF signal to the external electronic device. For example, the Bluetooth communication module 205 may output the RF signal to the outside as in operation 253 of FIG. 2.

If a response corresponding to the output RF signal is received from the external electronic device, the Bluetooth communication module 205 may reconnect the Bluetooth communication with the external electronic device and transfer a response indicating that the attempt to reconnect Bluetooth communication succeeds to the processor 201. In contrast, unless a response corresponding to the output RF signal is received from the external electronic device, the Bluetooth communication module 205 may transfer a response indicating that the attempt to reconnect Bluetooth communication fails to the processor 201. For example, the Bluetooth communication module 205 may transfer a response indicating whether the reconnection attempt succeeds or fails to the Bluetooth stack 220 as in operation 254 of FIG. 2.

If the response as to whether the reconnection attempt succeeds or fails is transferred to the Bluetooth stack 220, a callback function including information related to the response may be transferred from the Bluetooth stack 220 to the Bluetooth application 210. For example, the processor 201 may invoke the callback function including the response-related information from the Bluetooth application 210 as in operation 255 of FIG. 2.

If the information included in the callback function transferred to the Bluetooth application 210 is related to failure in the reconnection attempt, the processor 201 and the Bluetooth communication module 205 may repeat operations 251, 252, 253, 254, and 255 until the reconnection of Bluetooth communication succeeds.

Figure 3:
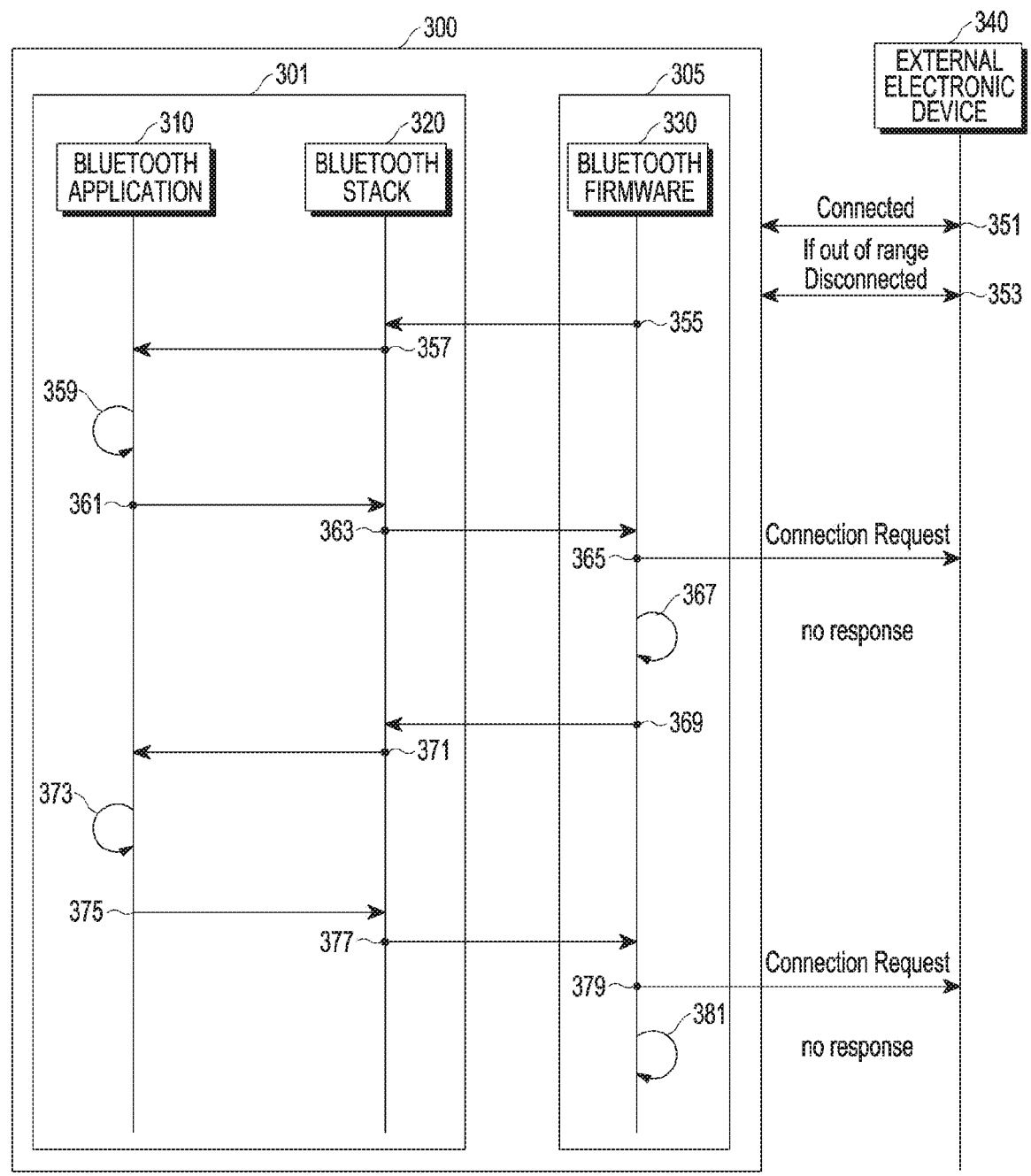
FIG. 3 is a view illustrating a method for reconnecting short-range wireless communication according to various embodiments of the present invention.

FIG. 3 is a view illustrating a method for reconnecting short-range wireless communication according to various embodiments of the present invention and diagrams the embodiment of FIG. 2.

Referring to FIG. 3, an electronic device 300 (e.g., the electronic device 101 of FIG. 1 or the electronic device 200 of FIG. 2) and an external electronic device 340 (e.g., the electronic device 102 of FIG. 1) may be wirelessly connected with each other via Bluetooth communication. For example, the electronic device 300 may communicate data with the external electronic device 340 using a processor 301 and a Bluetooth communication module 305. The processor 301 may include a Bluetooth application 310 and a Bluetooth stack 320. Further, the Bluetooth communication module 305 may include Bluetooth firmware 330.

According to an embodiment, as in operation 351, the electronic device 300 and the external electronic device 340 may be connected with each other via Bluetooth communication and communicate data therebetween. If the distance between the electronic device 300 and the external electronic device 340 increases as in operation 353, e.g., if the distance exceeds the Bluetooth communication-capable distance, the Bluetooth communication between the electronic devices may be disconnected.

If the Bluetooth communication between the electronic device 300 and the external electronic device 340 is disconnected, the Bluetooth firmware 330 may transmit information related to the disconnection to the Bluetooth stack 320 via a host control interface (HCI) in operation 355.

If the disconnection-related information is received from the Bluetooth firmware 330, the Bluetooth stack 320 may transmit information indicating that the Bluetooth communication connection state has been changed to the Bluetooth application 310 in operation 357.

Upon receiving the information indicating that the Bluetooth communication connection state has been varied from the Bluetooth stack 320, the Bluetooth application 310 may determine whether the profiles included in the Bluetooth application 310 includes a profile requiring reconnection of Bluetooth communication in operation 359. If there is a specific profile determined to need reconnection of Bluetooth communication, the Bluetooth application 310 may invoke the API corresponding to the specific profile from the Bluetooth stack 320 in operation 361.

Upon receiving an instruction to invoke the API corresponding to the specific profile from the Bluetooth application 310, the Bluetooth stack 320 may transmit a reconnection request for Bluetooth communication for the specific profile to the Bluetooth firmware 330 via the HCI in operation 363.

Upon receiving the reconnection request for Bluetooth communication from the Bluetooth stack 320, the Bluetooth firmware 330 may generate an RF signal corresponding to the received reconnection request and output the generated RF signal to the outside in operation 365. If a response corresponding to the RF signal is not received from the external electronic device 340 within a preset time or a response related to being unable to connect from the external electronic device 340, the Bluetooth firmware 330 may determine that the attempt to reconnect Bluetooth communication fails in operation 367. In operation 369, the Bluetooth firmware 330 may transfer a response indicating that the attempt to reconnect Bluetooth communication fails to the Bluetooth stack 320 via the HCI.

Subsequent operations 371, 373, 375, 377, 379, and 381 may be the same as operations 357, 359, 361, 363, 365, and 367, respectively, and the operations may be repeated until an attempt to reconnect Bluetooth communication succeeds.

According to an embodiment, assuming that Bluetooth communication connection between the electronic device 300 and the external electronic device 340 succeeds after 100 attempts to reconnect are made, the processor 301 and the Bluetooth communication module 305 may be appreciated as having performed each of operation 355 or 369, operation 357 or 371, operation 363 or 377, operation 365 or 379, and operation 365 or 379 one hundred times.

More specifically, the processor 301 may perform the operation of invoking the API corresponding to the specific profile from the Bluetooth stack 320 one hundred times. Further, the processor 301 may perform the operation of transmitting a reconnection request for Bluetooth communication for the specific profile to the Bluetooth firmware 330 one hundred times. Further, the Bluetooth communication module 305 may perform the operation of outputting an RF signal to the outside one hundred times. Further, the Bluetooth communication module 305 may transfer a response indicating whether the reconnection attempt succeeds or fails to the Bluetooth stack 320 one hundred times. Further, the processor 301 may perform the operation of invoking a callback function related to a response indicating whether the reconnection attempt succeeds or fails to the Bluetooth stack 310 from the Bluetooth application 310 one hundred times. As such, if the attempt to reconnect Bluetooth communication is performed one hundred times, data transmission/reception between the Bluetooth application 310 and the Bluetooth stack 320 in the processor 301 may be performed two hundred times, data transmission/reception between the processor 301 and the Bluetooth communication module 305 may be performed two hundred times, and output of an RF signal by the Bluetooth communication module 305 may be performed one hundred times.

Figure 4:
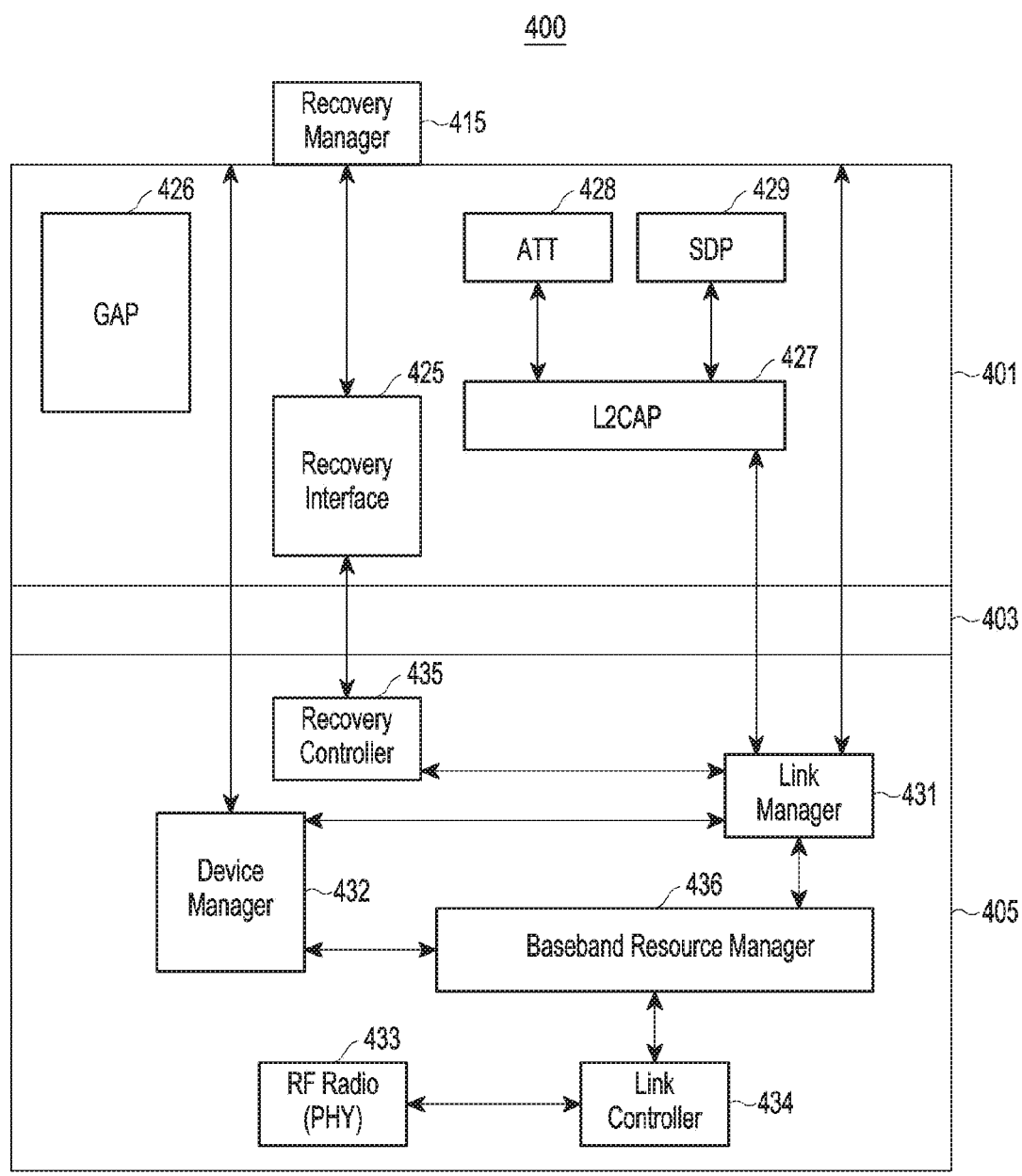
FIG. 4 is a view illustrating components of an electronic device used upon reconnecting short-range wireless communication according to various embodiments of the present invention.
Figure 5:
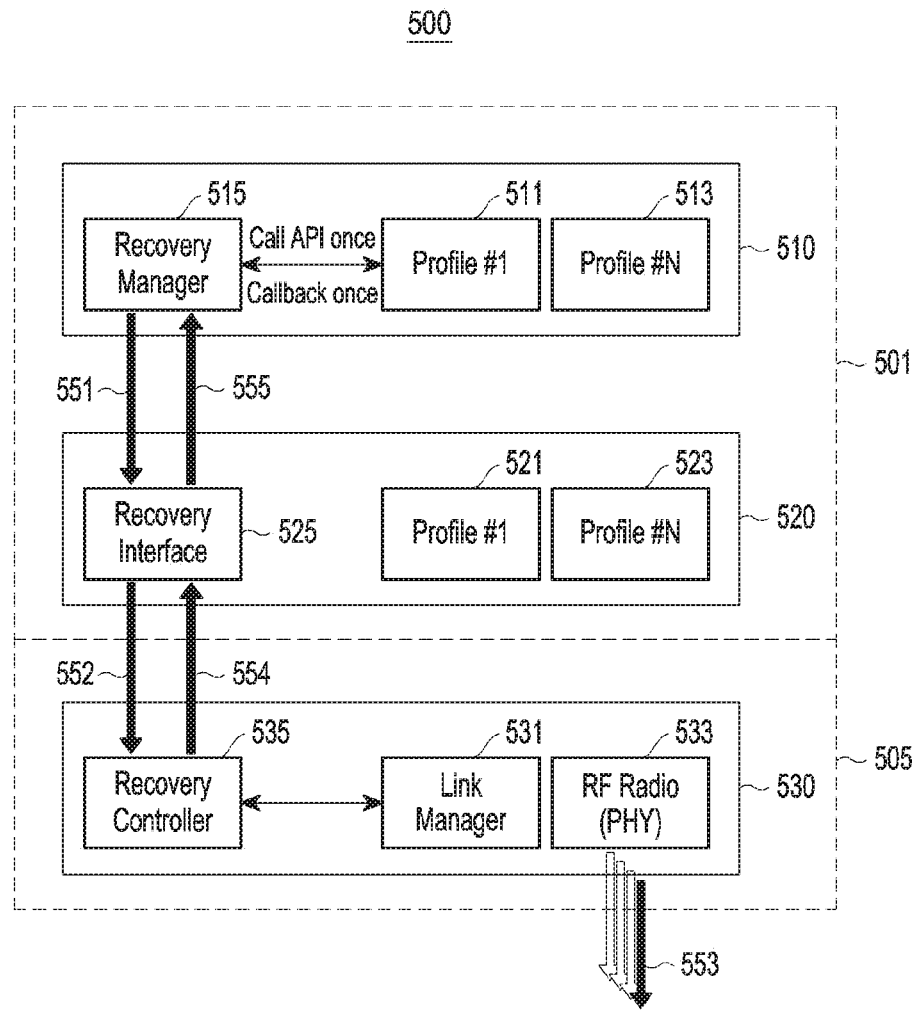
FIG. 5 is a view illustrating a software structure of an electronic device performing Bluetooth communication according to various embodiments of the present invention.
Figure 6:
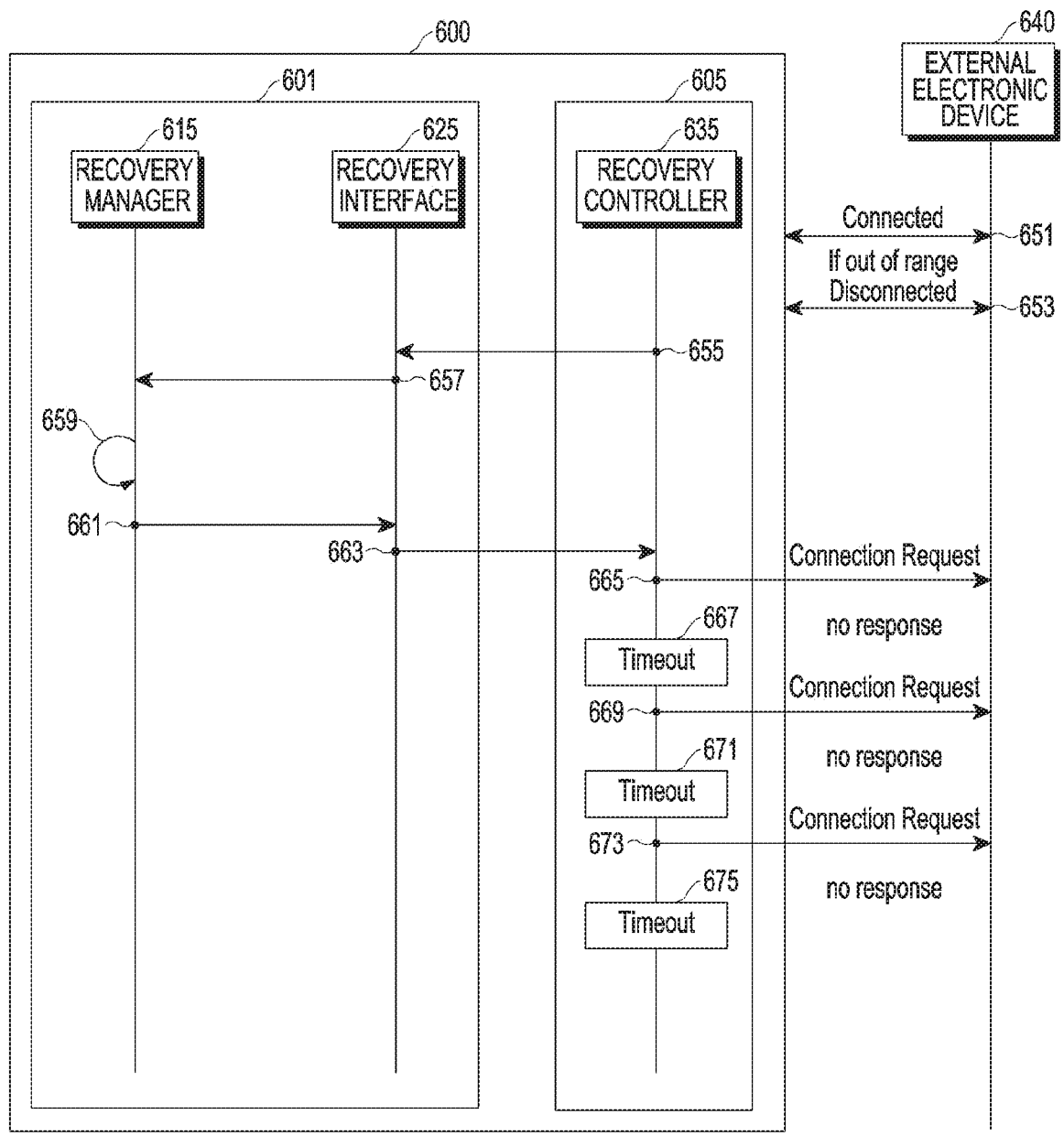
FIG. 6 is a view illustrating a method for reconnecting short-range wireless communication according to various embodiments of the present invention.

Meanwhile, data transmission/reception between the processor 301 and the Bluetooth communication module 305 may be performed via universal asynchronous receiver/transmitter (UART) communication. That is, since data transmission/reception performed two hundred times between the processor 301 and the Bluetooth communication module 305 is an operation between hardware modules based on UART communication, it may consume more power than other processes performed in the hardware modules. Thus, power consumption may be reduced by decreasing the number of times in which data transmission/reception is performed between the processor 301 and the Bluetooth communication module 305. FIGS. 4 to 6 disclose embodiments related to methods of reducing the number of times of data transmission/reception performed between the processor 301 and the Bluetooth communication module 305.

FIG. 4 is a view illustrating components of an electronic device used upon reconnecting short-range wireless communication according to various embodiments of the present invention.

According to an embodiment, an electronic device 400 (e.g., the electronic device 101 of FIG. 1) may include a processor 401 and a Bluetooth communication 30 module 405 (e.g., the wireless communication module 192 of FIG. 1), and the processor 401 and the Bluetooth communication module 405 may communicate data via an interface 403. The interface 403 may include a host control interface (HCI).

The electronic device 400 may further include a recovery manager 415, a recovery interface 425, and a recovery controller 435.

The recovery manager 415 may determine whether Bluetooth communication disconnection is intentional by the user's selection or unintentional under an unexpected context. For example, if the Bluetooth communication module 405 is deactivated by an input received from the user of the electronic device 400, the recovery manager 415 may determine that the Bluetooth communication disconnection is intentional by the user's selection. Or, if Bluetooth communication dwindles in signal strength and is disconnected, e.g., because the electronic devices part away from each other, the recovery manager 415 may determine that Bluetooth communication disconnection is unintentional under an unexpected context. Or, if Bluetooth communication is disconnected after an abrupt radio wave interruption is detected, the recovery manager 415 may determine that Bluetooth communication disconnection is unintentional due to an unexpected situation. It will readily be appreciated by one of ordinary skill in the art that the recovery manager 415 may determine whether Bluetooth communication disconnection is intentional or accidental based on other various conditions or contexts than in the above-described embodiments. As such, based on whether Bluetooth communication disconnection is intentional or not, the recovery manager 415 may determine whether to recover Bluetooth communication connection.

Further, the recovery manager 415 may generate an instruction or function that may be used to recover Bluetooth communication connection. At this time, the generated instruction or function may be transferred to the recovery controller 435 for use in controlling the operation of the Bluetooth communication module 405. For example, the recovery manager 415 may define (or generate) ReconnectOffload( ) as a function to be transferred to the recovery manager 435 and may generate Interval (period in which reconnection is attempted), Timeout (duration during which reconnection is attempted), DeviceNumber (number of devices to be reconnected), and BluetoothAddress (physical address of the device to be reconnected), as variables applicable to the function. Other various variables necessary for reconnecting Bluetooth communication may be defined.

The recovery interface 425 may be a module serving as a software interface necessary for communication between the processor 401 and the Bluetooth communication module 405, and the recovery interface 425 may transfer the instruction or function generated by the recovery manager 415 when recovering the Bluetooth communication connection to the recovery controller 435 or transfer a response generated by the recovery controller 435 when Bluetooth communication connection succeeds or fails to the recovery manager 415.

The recovery controller 435, after receiving, via the recovery interface 425, the instruction or function defined and generated by the recovery manager 415, may control the operation of at least one of components included in the Bluetooth communication module 405 according to the received instruction or function. Further, if the attempt to reconnect Bluetooth communication succeeds or fails, the recovery controller 435 may generate a response related to success or failure and transmit the same to the recovery manager 415 via the recovery interface 425.

According to another embodiment, the processor 401 may include a generic access profile (GAP) 426, an attribute protocol (ATT) 428, a service discovery protocol (SDP) 429, and a logical link control and adaption protocol (L2CAP) 427, as defined in the Bluetooth communication standards. Further, the Bluetooth communication module 405 may include a link manager 431, a device manager 432, an RF radio (PHY) 433, a link controller 434, and a baseband resource manager 436 as defined in the Bluetooth communication standards.

According to an embodiment, the recovery manager 415 and the recovery interface 425 may be included in the processor 401. Further, the recovery controller 435 may be included in the Bluetooth communication module 405. Meanwhile, although the recovery manager 415, the recovery interface 425, and the recovery controller 435 may mean modules performing the above-described particular operations, embodiments of the present invention are not limited thereto, and operations performed by the recovery manager 415, the recovery interface 425, and the recovery controller 435 may also be interpreted as processed by the processor 401 or the Bluetooth communication module 405. Further, the processor 401 may be interpreted as denoting a Bluetooth host, and it will be readily appreciated by one of ordinary skill in the art that other various means capable of processing may be interpreted as the processor 401 without limitations. Further, the Bluetooth communication module 405 may be appreciated as meaning a hardware component, e.g., circuit, as well as a software component performing operations related to Bluetooth communication.

FIG. 5 is a view illustrating a software structure of an electronic device performing Bluetooth communication according to various embodiments of the present invention.

According to an embodiment, an electronic device 500 (e.g., the electronic device 101 of FIG. 1) may include a processor 501 and a Bluetooth communication 30 module 505 (e.g., the wireless communication module 192 of FIG. 1). Further, the processor 501 may include a Bluetooth application 510 and a Bluetooth stack 520, and the Bluetooth communication module 505 may include Bluetooth firmware 530.

The Bluetooth application 510 may include one or more profiles 511 and 513 and a recovery manager 515 (e.g., the recovery manager 415 of FIG. 4). The recovery manager 515 may communicate data with one or more profiles 511 and 513 and, when Bluetooth communication is disconnected, determine whether to recover the connection. For example, the recovery manager 515 may obtain information necessary for invoking an API from at least one profile of the one or more profiles 511 and 513 and generate an instruction for invoking an API corresponding to at least one profile based on the obtained information. Further, the recovery manager 515 may obtain information about whether an attempt to reconnect Bluetooth communication succeeds or fails from the recovery controller 535 and generate a callback function including the obtained information.

The Bluetooth stack 520 may include one or more profiles 521 and 523 that are one-to-one matched to the profiles 511 and 513 included in the Bluetooth application to perform a series of communication operations. Further, the Bluetooth stack 520 may include a recovery interface 525 serving as a software interface necessary for communication between the recovery manager 515 and the recovery controller 535.

The Bluetooth firmware 530 may include a link manager 531, an RF radio 533, and a recovery controller 535. The recovery controller 535 may control the operation of at least one of components included in the Bluetooth communication module 505 based on an instruction or function defined and generated by the recovery manager 515. Further, if the attempt to reconnect Bluetooth communication succeeds or fails, the recovery controller 535 may generate a response related to success or failure and transmit the same to the recovery manager 515 via the recovery interface 525.

According to an embodiment, if Bluetooth communication between the electronic device 500 and the external electronic device is disconnected, the recovery manager 515 may determine whether the disconnection is attributed to the user's intention or an unexpected context. If determined to have been intended by the user, the recovery manager 515 may determine that no attempt to reconnect Bluetooth communication is needed. In contrast, upon determining that it results from an unexpected context, the recovery manager 515 may determine that an attempt to reconnect Bluetooth communication is needed.

If a reconnection attempt is determined to be needed, the recovery manager 515 may generate an instruction or function that may be used to recover Bluetooth communication connection. To that end, the recovery manager 515 may obtain information necessary to invoke an API from at least one profile included in the Bluetooth application 510. Here, the at least one profile may include the profile for which reconnection of beam management is determined to be necessary by the processor 501. The recovery manager 515 may generate an instruction or function for invoking an API corresponding to at least one profile based on the obtained information. Upon generating an instruction or function, the recovery manager 515 may generate data or variables including information about at least one of the number of times in which reconnection is attempted, the period in which reconnection is attempted, duration during which reconnection is attempted, the number of electronic devices to which reconnection is attempted, and the physical address of the electronic device to which reconnection is attempted. For example, if reconnection is attempted one hundred times to recover Bluetooth communication connection, the recovery manager 515 may allocate 100 to the variable indicating the number of times in which reconnection is attempted and generate an instruction or function.

Subsequently, the recovery manager 515 may transmit the generated instruction or function to the recovery interface 525 in operation 551. Further, in operation 552, the recovery interface 525 may transmit the received instruction or function to the recovery controller 535. In relation thereto, the operation performed by the Bluetooth stack 520 corresponding to the invocation of API may be omitted. That is, since the recovery manager 515 and the recovery controller 535 may be directly connected via the recovery interface 525, data may be transmitted/received regardless of whether there is operation by the Bluetooth stack 520. If the instruction or function generated by the recovery manager 515 is transferred to the recovery controller 535, the processor 501 may switch into inactive or sleep mode, thus saving power.

The recovery controller 535 may control the operation of at least one component included in the Bluetooth communication module 505 according to the instruction or function received from the recovery manager 515. For example, if the received function contains a variable related to attempting reconnection one hundred times in total every second, the recovery controller 535 may perform up to 100 Bluetooth communication reconnection attempts every second. More specifically, the recovery controller 535 may generate an RF signal corresponding to the reconnection request via the link manager 531 and the RF radio 533 and, in operation 553, output the generated RF signal to the external electronic device.

If a response corresponding to the output RF signal is received from the external electronic device, the recovery controller 535 may generate or output no additional RF signal. In this case, the recovery controller 535 may reconnect Bluetooth communication with the external electronic device and, in operations 554 and 555, transfer a response indicating that Bluetooth communication reconnection attempt has succeeded to the recovery manager 515. If the response is transferred to the recovery manager 515, the processor 501 may be activated.

In contrast, if a response corresponding to the output RF signal is not received within one second, the recovery controller 535 may again generate and output an RF signal. That is, if no response corresponding to the output RF signal is received, the recovery controller 535 may repeat the generation and output of an RF signal up to 100 times. Meanwhile, while the operation of regenerating and outputting an RF signal is performed by the Bluetooth communication module 505, the processor 501 may remain in the inactive or sleep mode. If no response is received even after one hundred attempts, the recovery controller 535 may transfer a response indicating that the operation according to the prior-received function has failed to the recovery manager 515 in operations 554 and 555. Upon receiving a response, the recovery manager 515 may generate an instruction or function for re-requesting a reconnection attempt or an instruction or function for requesting to stop a reconnection attempt and transfer the instruction or function to the recovery controller 535.

FIG. 6 is a view illustrating a method for reconnecting short-range wireless communication according to various embodiments of the present invention and diagrams the embodiment of FIG. 5.

Referring to FIG. 6, an electronic device 600 (e.g., the electronic device 101 of FIG. 1 or the electronic device 500 of FIG. 5) and an external electronic device 640 (e.g., the electronic device 102 of FIG. 1) may be wirelessly connected with each other via Bluetooth communication. For example, the electronic device 600 may communicate data with the external electronic device 640 using a processor 601 and a Bluetooth communication module 605. The processor 601 may include a recovery manager 615 (e.g., the recovery manager 515 of FIG. 5) and a recovery interface 625 (e.g., the recovery interface 525 of FIG. 5). Further, the Bluetooth communication module 605 may include a recovery controller 635.

According to an embodiment, as in operation 651, the electronic device 600 and the external electronic device 640 may be connected with each other via Bluetooth communication and communicate data therebetween. If the distance between the electronic device 600 and the external electronic device 640 increases as in operation 653, e.g., if the distance exceeds the Bluetooth communication-capable distance, the Bluetooth communication between the electronic devices may be disconnected.

If the Bluetooth communication between the electronic device 600 and the external electronic device 640 is disconnected, the recovery controller 635 may transmit information related to the disconnection to the recovery interface 625 via a host control interface (HCI) in operation 655.

If the disconnection-related information is received from the recovery controller 635, the recovery interface 625 may transmit information indicating that the Bluetooth communication connection state has been changed to the recovery manager 615 in operation 657.

Upon receiving the information indicating that the Bluetooth communication connection state has been changed from the recovery interface 625, the recovery manager 615 may determine whether the disconnection is attributed to the user's intention or an unexpected context in operation 659. If determined to have been intended by the user, the recovery manager 615 may determine that no attempt to reconnect Bluetooth communication is needed. In contrast, upon determining that it results from an unexpected context, the recovery manager 615 may determine that an attempt to reconnect Bluetooth communication is needed.

If a reconnection attempt is determined to be needed, the recovery manager 615 may generate an instruction or function that may be used to recover Bluetooth communication connection. To that end, the recovery manager 615 may obtain information necessary to invoke an API from at least one profile included in the Bluetooth application (e.g., the Bluetooth application 510 of FIG. 5). Here, the at least one profile may include the profile for which reconnection of beam management is determined to be necessary by the processor 601. The recovery manager 615 may generate an instruction or function for invoking an API corresponding to at least one profile based on the obtained information. Upon generating an instruction or function, the recovery manager 615 may generate data or variables including information about at least one of the number of times in which reconnection is attempted, the period in which reconnection is attempted, duration during which reconnection is attempted, the number of electronic devices to which reconnection is attempted, and the physical address of the electronic device to which reconnection is attempted. For example, if reconnection is attempted one hundred times to recover Bluetooth communication connection, the recovery manager 615 may allocate 100 to the variable indicating the number of times in which reconnection is attempted and generate an instruction or function.

Subsequently, the recovery manager 615 may transmit the generated instruction or function to the recovery interface 625 in operation 661. Further, in operation 663, the recovery interface 625 may transmit the received instruction or function to the recovery controller 635.

Upon receiving the instruction or function related to Bluetooth communication reconnection from the recovery interface 625, the recovery controller 635 may generate an RF signal corresponding to the received instruction or function and output the generated RF signal to the outside in operation 665. For example, if the received function contains a variable related to attempting reconnection one hundred times in total every second, the recovery controller 635 may perform up to 100 Bluetooth communication reconnection attempts every second.

If a response corresponding to the RF signal output in operation 665 is not received within one second, the recovery controller 635 may determine that the reconnection attempt has failed in operation 667. For example, if a preset time (e.g., one second) elapses, the recovery controller 635 may determine a timeout in operation 667. Upon determining a timeout in operation 667, the recovery controller 635 may regenerate an RF signal and output the generated RF signal to the outside in operation 669. Or, upon determining a timeout in operation 667, the recovery controller 635 may re-output the pre-generated RF signal to the outside in operation 669. If a response corresponding to the RF signal output in operation 669 is not received within one second, the recovery controller 635 may determine that the reconnection attempt has failed in operation 671. Upon determining a timeout in operation 671, the recovery controller 635 may regenerate an RF signal and output the generated RF signal to the outside in operation 673. Or, upon determining a timeout in operation 671, the recovery controller 635 may re-output the pre-generated RF signal to the outside in operation 673. If a response corresponding to the RF signal output in operation 673 is not received within one second, the recovery controller 635 may determine that the reconnection attempt has failed in operation 675.

As such, if a response corresponding to the output RF signal is not received within a preset time in operations 667, 671, and 675, the recovery controller 635 may regenerate and output an RF signal in operations 669 and 673. That is, if no response corresponding to the output RF signal is received, the recovery controller 635 may repeat the generation and output of an RF signal up to 100 times. Meanwhile, while the operation of regenerating and outputting an RF signal is performed by the Bluetooth communication module 605, the processor 601 may remain in the inactive or sleep mode. If no response is received even after one hundred attempts, the recovery controller 635 may transfer a response indicating that the operation according to the prior-received function has failed to the recovery manager 615. Upon receiving a response, the recovery manager 615 may generate an instruction or function for re-requesting a reconnection attempt or an instruction or function for requesting to stop a reconnection attempt and transfer the instruction or function to the recovery controller 635.

Figure 7:
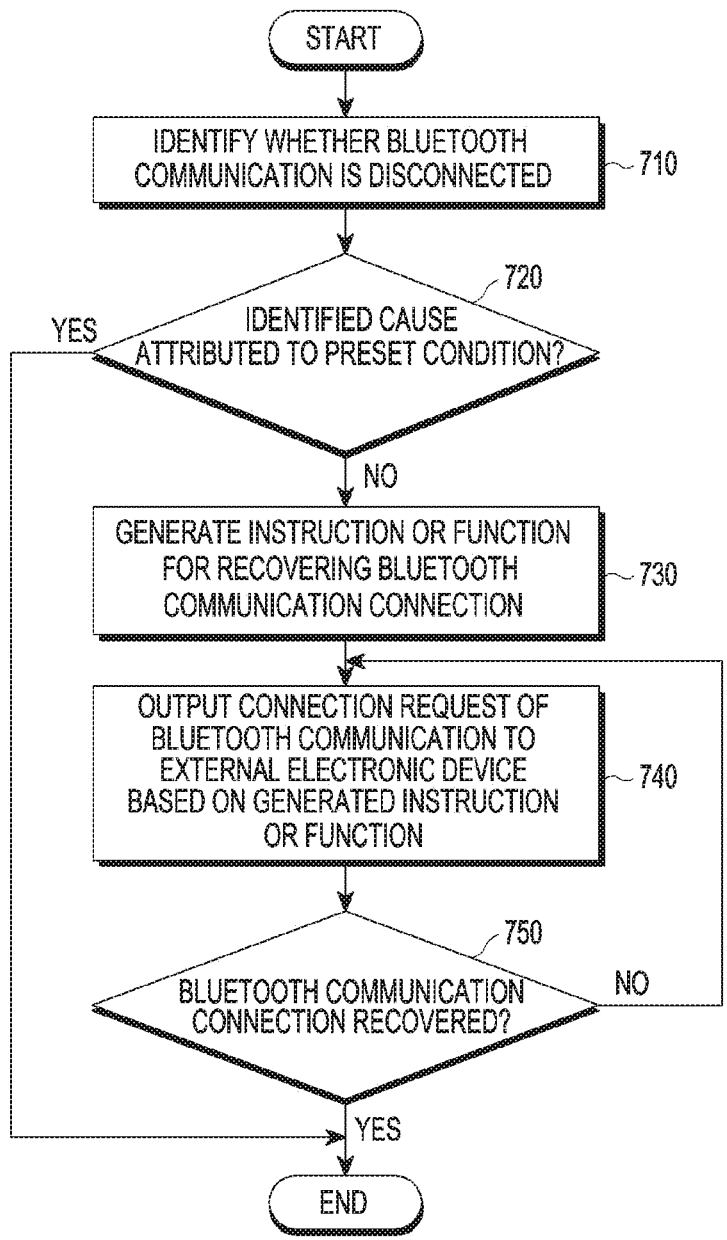
FIG. 7 is a flowchart illustrating a method of identifying the cause of disconnection of short-range wireless communication with an external electronic device and reconnecting short-range wireless communication based on the identified cause by an electronic device according to various embodiments of the present invention.

FIG. 7 is a flowchart illustrating a method of identifying the cause of disconnection of short-range wireless communication with an external electronic device and reconnecting short-range wireless communication based on the identified cause by an electronic device according to various embodiments of the present invention.

The entity to perform the method in an electronic device (e.g., the electronic device 101 of FIG. 1) including at least one processor (e.g., the processor 120 of FIG. 1) and a Bluetooth communication module (e.g., the wireless communication module 192 of FIG. 1) may be the at least one processor. Here, at least one processor may include an application processor (AP) (e.g., the main processor 121 of FIG. 1) controlling the overall operation of the components of the electronic device and a control circuit (e.g., the auxiliary processor 123 of FIG. 1) included in a Bluetooth communication module and controlling the operation of the Bluetooth communication module.

According to an embodiment, in operation 710, at least one processor may identify whether Bluetooth communication is disconnected. For example, an electronic device (e.g., the electronic device 101 of FIG. 1 or the electronic device 600 of FIG. 6) and an external electronic device (e.g., the electronic device 102 of FIG. 1 or the external electronic device 640 of FIG. 6) may be wirelessly connected together via Bluetooth communication. The electronic device may communicate data with the external electronic device using the processor and the Bluetooth communication module. Upon determining that Bluetooth communication with the external electronic device is disconnected, at least one processor may perform operation 720.

In operation 720, at least one processor may identify the cause of disconnection of Bluetooth communication with the external electronic device. For example, the at least one processor may determine whether the disconnection is attributed to the user's intention or an unexpected context. If determined to have been intended by the user, the at least one processor may determine that no attempt to reconnect Bluetooth communication is needed. In contrast, upon determining that it results from an unexpected context, the at least one processor may determine that an attempt to reconnect Bluetooth communication is needed. Upon determining that the identified cause is a preset condition, e.g., the user's intention, the at least one processor may perform no operation. In contrast, upon determining that the identified cause does not result from a preset condition, the at least one processor may perform operation 730.

In operation 730, the at least one processor may generate an instruction or function for recovering Bluetooth communication connection. For example, upon determining that the identified cause does not result from the preset condition, the at least one processor may determine that there is a need for recovering Bluetooth communication connection. Thus, the at least one processor may generate an instruction or function available to attempt to reconnect Bluetooth communication. According to an embodiment, the operation of generating the instruction or function may be performed by the AP of the electronic device. Further, if the generation of an instruction or function is complete, the AP may transmit the generated instruction or function to the control circuit included in the Bluetooth communication module.

In operation 740, the at least one processor may output a Bluetooth communication connection request to the external electronic device (e.g., the electronic device 102 of FIG. 1) based on the generated instruction or function. For example, upon receiving an instruction or function for recovering Bluetooth communication connection from the AP, the control circuit included in the Bluetooth communication module may control the components of the Bluetooth communication module to generate an RF signal and output the generated RF signal to the outside.

In operation 750, the at least one processor may determine whether Bluetooth communication connection is recovered. For example, upon receiving a response corresponding to the output RF signal from the external electronic device, the at least one processor may recover the Bluetooth communication connection. In this case, the control circuit of the Bluetooth communication module may transmit a response indicating that the Bluetooth communication connection has been recovered to the AP.

In contrast, if a response corresponding to the output RF signal is not received, the at least one processor may determine that the attempt to reconnect Bluetooth communication has failed. In this case, the control circuit of the Bluetooth communication module may repeat operation 740. Meanwhile, the number of times of repeating operations 740 and 750, period, and duration may be determined when the instruction or function is generated in operation 730.

Figure 8:
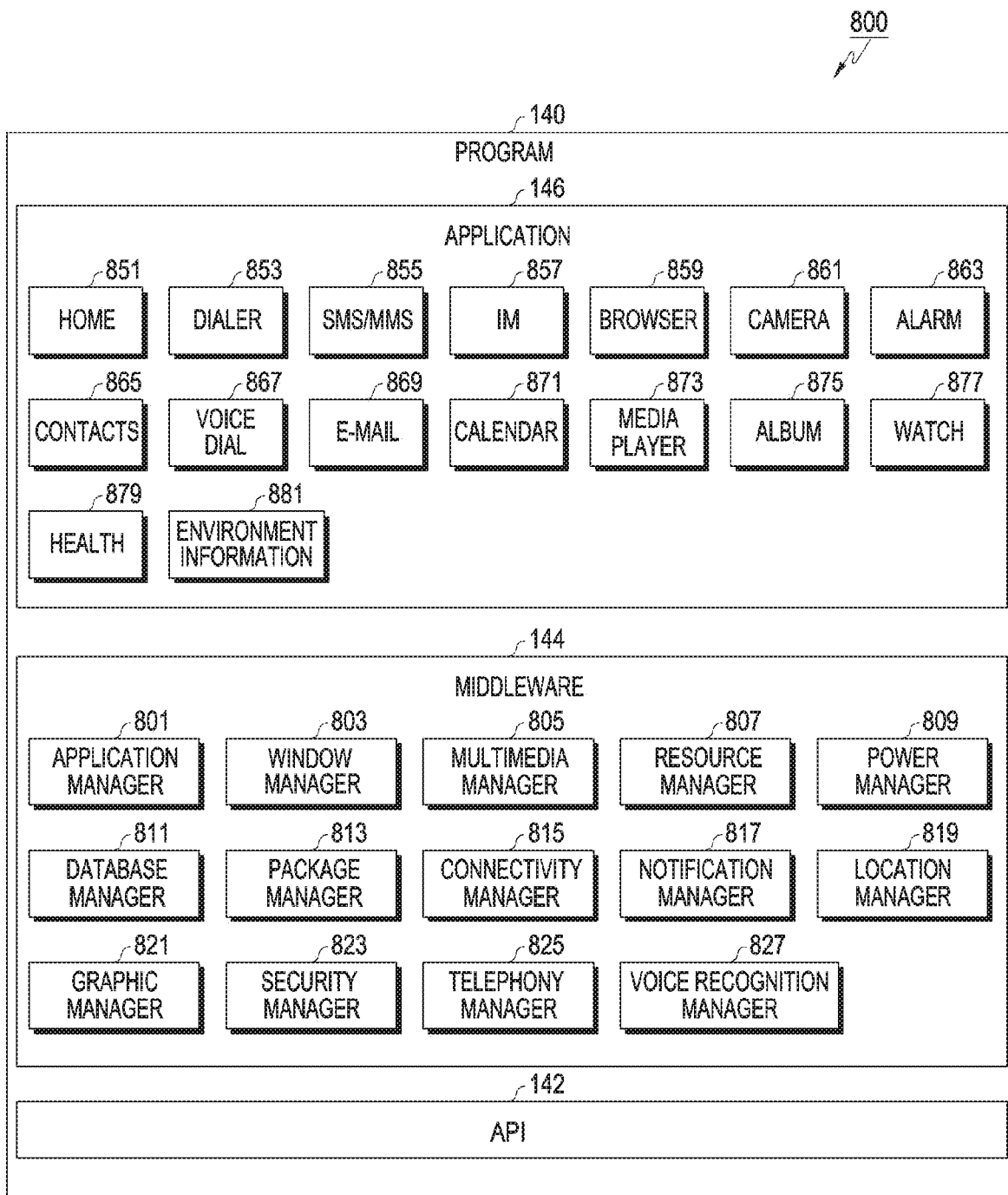
FIG. 8 is a block diagram illustrating a program according to various embodiments of the present invention.

FIG. 8 is a block diagram 800 illustrating a program 140 according to an embodiment. According to an embodiment, the program 140 may include an operating system (OS) 142 to control one or more resources of the electronic device 101, middleware 144, or an application 146 executable on the OS 142. The OS 142 may include, for example, Android™, iOS™, Windows™, Symbian™, Tizen™, or Bada™. At least part of the program 140 may be pre-loaded on the electronic device 101, e.g., upon manufacture, or may be downloaded or updated by an external electronic device (e.g., the electronic device 102 or 104 or the server 108) in a user's use environment.

The OS 142 may control (e.g., allocate or recover) system resources (e.g., the processor, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 so that the application 146 may use functions or information provided from one or more resources of the electronic device 101. The middleware 144 may include, for example, an application manager 801, a window manager 803, a multimedia manager 805, a resource manager 807, a power manager 809, a database manager 811, a package manager 813, a connectivity manager 815, a notification manager 817, a location manager 819, a graphic manager 821, a security manager 823, a telephony manager 825, or a voice recognition manager 827. The application manager 801 may manage the life cycle of, e.g., the applications 146. The window manager 803 may manage, e.g., GUI resources used on the screen. The multimedia manager 805 may grasp, e.g., formats necessary to play media files and use a codec appropriate for a format to perform encoding or decoding on media files. The resource manager 807 may manage, e.g., the source code or memory space of the application 146. The power manager 809 may manage, e.g., the capacity, temperature, or power of the battery and determine and provide power information necessary for the operation of the electronic device 101 using a corresponding piece of information of such. According to an embodiment of the disclosure, the power manager 809 may interwork with a basic input/output system (BIOS).

The database manager 811 may generate, search, or vary a database to be used in the applications 146. The package manager 813 may manage, e.g., installation or update of an application that is distributed in the form of a package file. The connectivity manager 815 may manage, e.g., wireless or wired connection between the electronic device 101 and an external electronic device. The notification manager 817 may provide, e.g., a function for notifying a user of an event (e.g., a call, message, or alert) that occurs. The location manager 819, for example, may manage locational information on the electronic device 101. The graphic manager 821 may manage graphic effects to be offered to the user and their related user interface. The security manager 823 may provide system security or user authentication, for example. The telephony manager 825 may manage, e.g., a voice call or video call function of the electronic device 101. The voice recognition manager 827 may transmit, e.g., a user's voice data to the server 108 and receive a command corresponding to a function to be executed on the electronic device 101 based on the voice data or text data converted based on the voice data. According to an embodiment, the middleware 844 may dynamically delete some existing components or add new components. According to an embodiment, at least part of the middleware 144 may be included as part of the OS 142 or may be implemented in separate software from the OS 142.

The application 146 may include, e.g., an application, such as a home 851, a dialer 853, an SMS/MMS 855, an instant message (IM) 857, a browser 859, a camera 861, an alarm 863, a contact 865, a voice recognition 867, an email 869, a calendar 871, a media player 873, an album 875, or a clock 877, a health 879 (e.g., measuring the degree of workout or blood sugar), or environmental information 881 (e.g., air pressure, moisture, or temperature information). According to an embodiment, the application 146 may further include an information exchanging application (not shown) that is capable of supporting information exchange between the electronic device 101 and the external electronic device. The information exchange application may include, e.g., a notification relay application for transferring designated information (e.g., a call, message, or alert) to the external electronic device or a device management application for managing the external electronic device. The notification relay application may transfer notification information corresponding to an event (e.g., receipt of an email) that occurs at another application (e.g., the email application 869) of the electronic device 101 to the external electronic device, or the notification relay application may receive notification information from the external electronic device and provide the notification information to a user of the electronic device 101. The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

Figure 9:
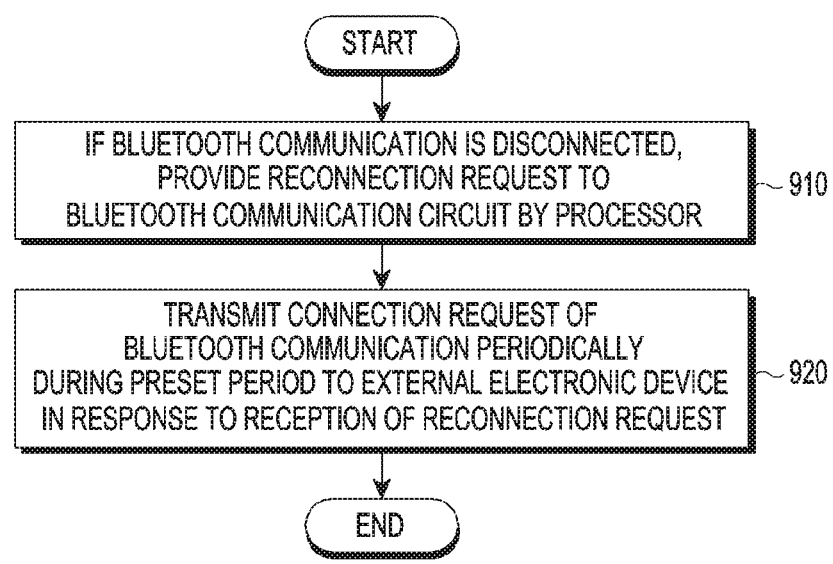
FIG. 9 is a flowchart illustrating a method of attempting to reconnect short-range wireless communication disconnected from an external electronic device by an electronic device according to various embodiments of the present invention.

FIG. 9 is a flowchart illustrating a method of attempting to reconnect short-range wireless communication disconnected from an external electronic device by an electronic device according to various embodiments of the present invention.

The entity to perform the method in an electronic device (e.g., the electronic device 101 of FIG. 1) including at least one processor (e.g., the processor 120 of FIG. 1) and a Bluetooth communication module (e.g., the wireless communication module 192 of FIG. 1) may be the at least one processor. Here, at least one processor may include an application processor (AP) (e.g., the main processor 121 of FIG. 1) controlling the overall operation of the components of the electronic device and a control circuit (e.g., the auxiliary processor 123 of FIG. 1) included in a Bluetooth communication module and controlling the operation of the Bluetooth communication module.

According to an embodiment, in operation 910, at least one processor may provide a reconnection request to the at least one processor included in the Bluetooth communication circuit when Bluetooth communication is disconnected. For example, in an electronic device including an AP and a control circuit of Bluetooth communication module, the AP may provide a reconnection request to the control circuit included in the Bluetooth communication circuit if Bluetooth communication with the external electronic device is disconnected.

In operation 920, upon receiving the reconnection request from the AP, the control circuit may attempt to reconnect the Bluetooth communication with the external electronic device by transmitting a connection request of the Bluetooth communication to the external electronic device periodically during a preset period, without repeated invocation of application programming interfaces (APIs) received from the AP. As set forth above, operation 920 may be repeated until Bluetooth communication with the external electronic device is successfully connected. Or, operation 920 may be repeated a preset number of times, in a preset period, or during preset duration, based on at least one control signal received from the AP.

According to various embodiments of the present invention, a method for reconnecting Bluetooth communication by an electronic device (e.g., the electronic device 101 of FIG. 1) including a Bluetooth communication circuit may comprise, when Bluetooth communication with an external device (e.g., the electronic device 102 or 104 of FIG. 1) is disconnected, providing a reconnection request from a processor (e.g., the main processor 121 of FIG. 1) of the electronic device to a control circuit (e.g., the auxiliary processor 123 of FIG. 1) included in the Bluetooth communication circuit and, in response to reception of the reconnection request, attempting to reconnect the Bluetooth communication with the external device by transmitting a connection request of the Bluetooth communication from the control circuit to the external device periodically during a preset period, without repeated invocation of application programming interfaces (APIs) received from the processor.

According to various embodiments of the present invention, the method for reconnecting Bluetooth communication by an electronic device including a Bluetooth communication circuit may further comprise, after the Bluetooth communication is reconnected, providing a response corresponding to the reconnection request from the control circuit to the processor.

According to various embodiments of the present invention, the method for reconnecting Bluetooth communication by an electronic device including a Bluetooth communication circuit may comprise using universal asynchronous receiver-transmitter (UART) communication, by the control circuit, to receive the reconnection request and provide the response.

According to various embodiments of the present invention, the method for reconnecting Bluetooth communication by an electronic device including a Bluetooth communication circuit may comprise, the reconnection request may include an instruction related to at least one of information about the external device to receive the connection request of the Bluetooth communication, a period in which the connection request is transmitted, and a number of times in which the connection request is transmitted.

According to various embodiments of the present invention, the method for reconnecting Bluetooth communication by an electronic device including a Bluetooth communication circuit may comprise, based on the instruction, determining the external device to receive the connection request of the Bluetooth communication by the control circuit and after the connection request is transmitted, determining whether a response corresponding to the connection request is received from the external device.

According to various embodiments of the present invention, the method for reconnecting Bluetooth communication by an electronic device including a Bluetooth communication circuit may comprise, if the response corresponding to the connection request is not received before a new connection request is transmitted to the external device according to the period in which the connection request is transmitted, determining that the connection request fails and transmitting the new connection request to the external device, by the control circuit.

According to various embodiments of the present invention, the method for reconnecting Bluetooth communication by an electronic device including a Bluetooth communication circuit may comprise repeating the determination of whether the connection request fails and the transmission of the new connection request to the external device based on the number of times in which the connection request is transmitted.

According to various embodiments of the present invention, the method for reconnecting Bluetooth communication by an electronic device including a Bluetooth communication circuit may comprise, if a response corresponding to the connection request is not received within the number of times in which the connection request is transmitted, generating a response indicating that the attempt to reconnect the Bluetooth communication fails by the control circuit and transmitting the generated response to the processor by the control circuit.

According to various embodiments of the present invention, the method for reconnecting Bluetooth communication by an electronic device including a Bluetooth communication circuit may comprise, if the Bluetooth communication with the external device is disconnected, detecting a cause of the Bluetooth communication disconnection all the time by the processor, determining whether the detected cause results from a preset condition by the processor, and generating the reconnection request corresponding to determining that the detected cause does not result from the preset condition by the processor.

According to various embodiments of the present invention, there is provided a computer readable recording medium storing a program configured to execute a method for reconnecting Bluetooth communication by an electronic device including a Bluetooth communication circuit, the method comprising when Bluetooth communication with an external device is disconnected, providing a reconnection request from a processor of the electronic device to a control circuit included in the Bluetooth communication circuit and in response to reception of the reconnection request, attempting to reconnect the Bluetooth communication with the external device by transmitting a connection request of the Bluetooth communication from the control circuit to the external device periodically during a preset period, without repeated invocation of application programming interfaces (APIs) received from the processor.

The invention claimed is:

1. An electronic device, comprising:
   a Bluetooth communication circuit including a control circuit;
   a processor electrically connected with the Bluetooth communication circuit; and
   a memory electrically connected with the processor,
   wherein the memory stores an instruction that, when Bluetooth communication with an external device is disconnected, enables the processor to provide a reconnection request to the control circuit,
   wherein the control circuit is configured to, in response to reception of the reconnection request, attempt to reconnect the Bluetooth communication with the external device by transmitting a connection request of the Bluetooth communication to the external device periodically during a preset period, without repeated invocation of application programming interfaces (APIs) received from the processor,
   wherein the reconnection request includes an instruction related to information about the external device to receive the connection request of the Bluetooth communication, a period in which the connection request is transmitted, and a number of times in which the connection request is transmitted, and
   wherein the information about the external device includes a physical address of the external device and the number of external device.

2. The electronic device of claim 1, wherein the control circuit is configured to, when the Bluetooth communication is reconnected, provide a response corresponding to the reconnection request to the processor.

3. The electronic device of claim 2, wherein the control circuit is configured to use universal asynchronous receiver/transmitter (UART) communication to receive the reconnection request and provide the response.

4. The electronic device of claim 1, wherein the control circuit is configured to determine the external device to receive the connection request of the Bluetooth communication based on the instruction and, after the connection request is transmitted, determine whether to receive a response corresponding to the connection request from the external device.

5. The electronic device of claim 4, wherein the control circuit is configured to, if the response corresponding to the connection request is not received before a new connection request is transmitted to the external device according to the period in which the connection request is transmitted, determine that the connection request fails and transmit the new connection request to the external device.

6. The electronic device of claim 5, wherein the control circuit is configured to repeat the determination of whether the connection request fails and the transmission of the new connection request to the external device based on the number of times in which the connection request is transmitted.

7. The electronic device of claim 6, wherein the control circuit is configured to, if the response corresponding to the connection request is not received within the number of times in which the connection request is transmitted, generate a response indicating that the attempt to reconnect the Bluetooth communication fails and transmit the generated response to the processor.

8. The electronic device of claim 1, wherein the memory stores instructions to enable the processor to:
   when the Bluetooth communication with the external device is disconnected, detect a cause of disconnection of the Bluetooth communication;
   determine whether the detected cause is due to a preset condition; and
   corresponding to determining that the detected cause is not due to the preset condition, generate the reconnection request.

9. A computer readable recording medium storing a program configured to execute a method for reconnecting Bluetooth communication by an electronic device including a Bluetooth communication circuit, the method comprising:
   when Bluetooth communication with an external device is disconnected, providing a reconnection request from a processor of the electronic device to a control circuit included in the Bluetooth communication circuit; and
   in response to reception of the reconnection request, attempting to reconnect the Bluetooth communication with the external device by transmitting a connection request of the Bluetooth communication from the control circuit to the external device periodically during a preset period, without repeated invocation of application programming interfaces (APIs) received from the processor, wherein the reconnection request includes an instruction related to information about the external device to receive the connection request of the Bluetooth communication, a period in which the connection request is transmitted, and a number of times in which the connection request is transmitted, and wherein the information about the external device includes a physical address of the external device and the number of external device.

10. The computer-readable recording medium of claim 9, wherein the method further comprises, after the Bluetooth communication is reconnected, providing a response corresponding to the reconnection request from the control circuit to the processor.

11. The computer-readable recording medium of claim 10, wherein the method further comprises using universal asynchronous receiver/transmitter (UART) communication, by the control circuit, to receive the reconnection request and provide the response.

12. The computer-readable recording medium of claim 9, wherein the method further comprises:

based on the instruction, determining the external device to receive the connection request of the Bluetooth communication by the control circuit;

after the connection request is transmitted, determining whether a response corresponding to the connection request is received from the external device; and if the response corresponding to the connection request is not received before a new connection request is transmitted to the external device according to the period in which the connection request is transmitted, determining that the connection request fails and transmitting the new connection request to the external device, by the control circuit.

13. The computer-readable recording medium of claim 12, wherein the method further comprises repeating the determination of whether the connection request fails and the transmission of the new connection request to the external device based on the number of times in which the connection request is transmitted.

* * * * *